United States Patent [19]

DeCaro

[11] 4,361,997
[45] Dec. 7, 1982

[54] FASTENER PLATE AND ASSEMBLY

[75] Inventor: Charles J. DeCaro, Pittsburgh, Pa.

[73] Assignee: Textron Inc., Providence, R.I.

[21] Appl. No.: 124,233

[22] Filed: Feb. 25, 1980

[51] Int. Cl.³ ............................ E04B 1/62; E04D 3/36
[52] U.S. Cl. ...................................... 52/512; 52/410; 52/698; 411/188; 411/533; 411/542; 411/368; 411/161
[58] Field of Search ............... 52/509, 506, 512, 410, 52/698; 411/531, 533, 542, 313, 411, 412, 389, 545, 188, 187

[56] References Cited

U.S. PATENT DOCUMENTS

| | | | |
|---|---|---|---|
| 1,286,862 | 12/1918 | Williams | 411/371 |
| 3,101,763 | 8/1963 | McGehee | 411/531 |
| 3,370,631 | 2/1968 | James | 411/188 |
| 3,478,639 | 11/1969 | Gruca | 411/531 |
| 4,074,501 | 2/1978 | Sandqvist | 52/410 |
| 4,075,807 | 2/1978 | Sirkin | 52/514 |

FOREIGN PATENT DOCUMENTS

| | | | |
|---|---|---|---|
| 525053 | 12/1953 | Belgium | 411/373 |
| 7614572 | 9/1976 | Fed. Rep. of Germany | |
| 947816 | 1/1964 | United Kingdom | 411/542 |
| 958847 | 5/1964 | United Kingdom | |
| 1027641 | 4/1966 | United Kingdom | 411/542 |
| 1455235 | 11/1976 | United Kingdom | |
| 1499224 | 1/1978 | United Kingdom | |
| 2024977 | 1/1980 | United Kingdom | |

Primary Examiner—John E. Murtagh
Assistant Examiner—Henry E. Raduazo
Attorney, Agent, or Firm—Webb, Burden, Robinson & Webb

[57] ABSTRACT

A plastic plate is provided for use with a fastener to secure insulation to a metal roof deck. The plate has a planar portion having a centrally disposed tapered hub portion. The central opening and preferably a clear through hole extends in the plate in the area of the hub. The bottom of the plate includes anti-rotational means for engagement with the insulation during driving of the fastener. The anti-rotational means may be associated with the bottom of the planar portion, the hub or both. The fastener may include two separate and spaced apart threaded portions so that as the fastener first engages the metal deck, the unthreaded portion is within the previously tapped hub portion.

15 Claims, 7 Drawing Figures

FASTENER PLATE AND ASSEMBLY

BACKGROUND OF THE INVENTION

1. Field of the Invention

This invention relates to fastening means, especially for securing insulation material to metal roof deck. More particularly, the invention involves a plastic plate alone and in combination with threaded fasteners for assembling insulation to such roof deck prior to topping off the roof with plies of synthetic coating, tar, gravel or like materials.

2. Description of the Prior Art

Metal plates of various configurations are being used, with appropriate fasteners, to secure insulation material to metal roof deck. Some of the metal plates being used have a prefabricated central hole to accept the fastener, and generally because such plates are thin, they include a plurality of stiffening ribs. The plates include a substantial bearing surface to enable it to hold the insulation against the deck against wind loads.

Such metal plates are subject to various deficiencies. One problem with the plates is that due to the forces developed during any overdriven condition of the fastener, the metal tends to bend and curl and develop sharp edges from the permanent set. The sharp edges can then penetrate the plies of material disposed over the insulation, especially if persons walk on it. This penetration is undersirable since it breaks the moisture barrier introducing possible areas of leakage in the roof structure.

In addition, prior art metal plates have a central hole which offer no assistance in aligning the fastener, which penetrates the insulation and the metal roof deck. Any misalignment introduces the possibility of undesirable penetration or tearing of the insulation and is a potential source of roof leakage.

Moreover, to keep down the cost of the metal plates, they are made as thin as possible. Even where reinforcing or stiffening ribs are used, the area of the hole in the plate still remains weak and offers a potential problem since it is subject to being pulled over the fastener, particularly in high winds.

Another problem with metal plates is that they are often stored for periods of time at the job site or are exposed during installation and thusly must be galvanized or otherwise treated to prevent rust. Also, metal plates tend to collect moisture through condensation and the ribs define barriers which may collect water or solvents used with the upper ply.

Recently, a method of making a watertight joint in a sealing layer for a roof has been disclosed in U.S. Pat. No. 4,074,501. According to that patent, a sealing layer comprising a sheet of synthetic resin is secured to the external face of a roof with the aid of plates made of plastics or plastic-coated material and fastening means. However, this patent teaches the need for extra sealing, no anti-rotational means are disclosed, the insulation is caused to bend rather than be penetrated and it is directed to applications where the upper ply is under the fastener rather than over it.

SUMMARY OF THE INVENTION

A plastic plate for use in securing insulation to metal decking comprises:

a substantially planar portion having top and bottom surfaces;

a hub portion depending from said bottom surface in a central part of said plate; and anti-rotational means, such as ribs, splines, other protrusions or a noncircular hub on the bottom surface of said plate for resisting rotation of said plate when it engages said insulation.

In presently preferred forms of the invention, there is a bore extending through the hub portion which is tapered for carrying an elongated fastener for securing the plate to metal roof deck and a counterbore is provided in the upper surface of the plate for seating the driving head of the fastener below the plane of the upper surface. A fastener and plate combination is also provided wherein only the end portion opposite the driving head is threaded or wherein the end portion and a portion spaced therefrom and adjacent the driving head are threaded. Since the self-tapping end of the fastener, which may be six inches or seven inches in length, is a substantial distance from the driving end, alignment of the fastener is important. In either case, the nonthreaded or smooth portion of the fastener shank has a pitch diameter approximately equal to the diameter of the bore in the hub portion to align the fastener as it is being driven through the insulation into the deck.

The aligning feature of my plate is most critical. The hub provides the assurance that the fastener will penetrate the insulation normal thereto and maintain that position while the fastener is drilling and tapping into the metal roof deck.

The plastic plate can be pre-positioned on the insulation before driving or, alternatively, the plate can be attached to the bottom of the tool and the fastener driven through it.

The use of plastic material solves the problem of corrosion of prior metal plates. In addition, since plastics have a greater affinity for conformance to the insulation than does metal, the sealing characteristics in the area of the fastener are improved. Moreover, the hub portion formed on the polyolefin plate provides an excellent seal and added strength to prevent being pulled over the fastener. The hub portion also assists in alignment of the fastener.

The preferred plastic materials are high density polyethylene and polypropylene. Such materials are flexible yet have "memory" and therefore will retain their original configuration without permanent set under normal loading. In addition, plastic materials do not have edges as sharp as metal and the "memory" will tend to prevent the fastener which is in intimate contact with the plate from vibrating and becoming loose.

DESCRIPTION OF THE PREFERRED EMBODIMENTS

Figure 1:
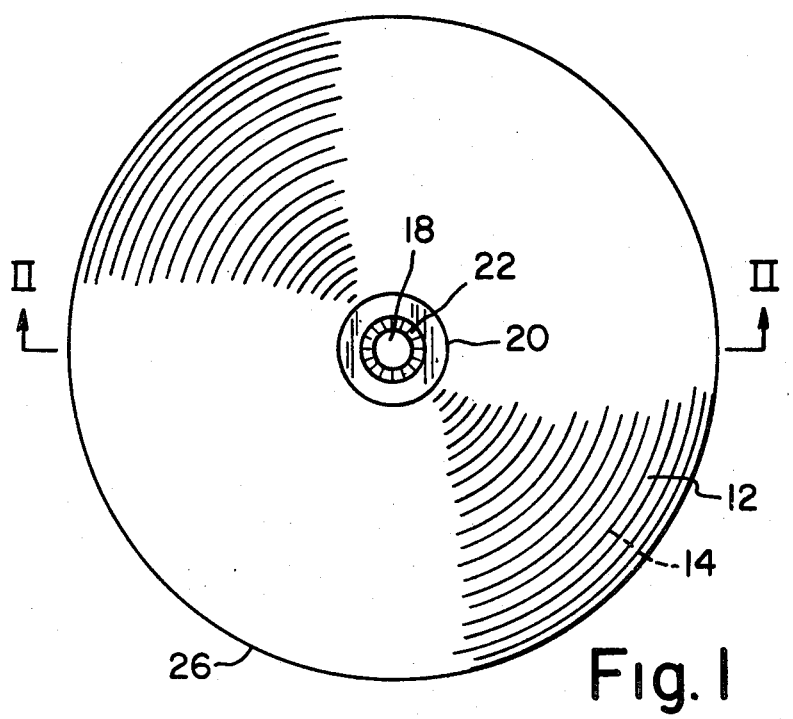
FIG. 1 is a plan view of a plastic plate in accordance with the invention.
Figure 2:
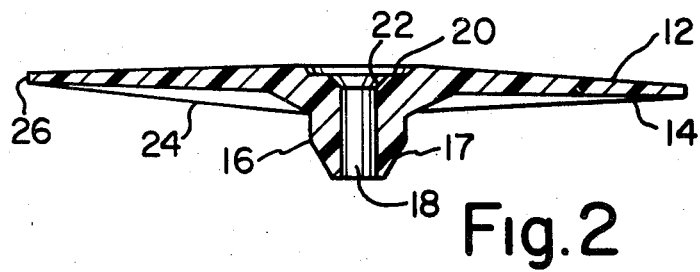
FIG. 2 is a cross-sectional view of the plate taken along lines II—II of FIG. 1.
Figure 3:
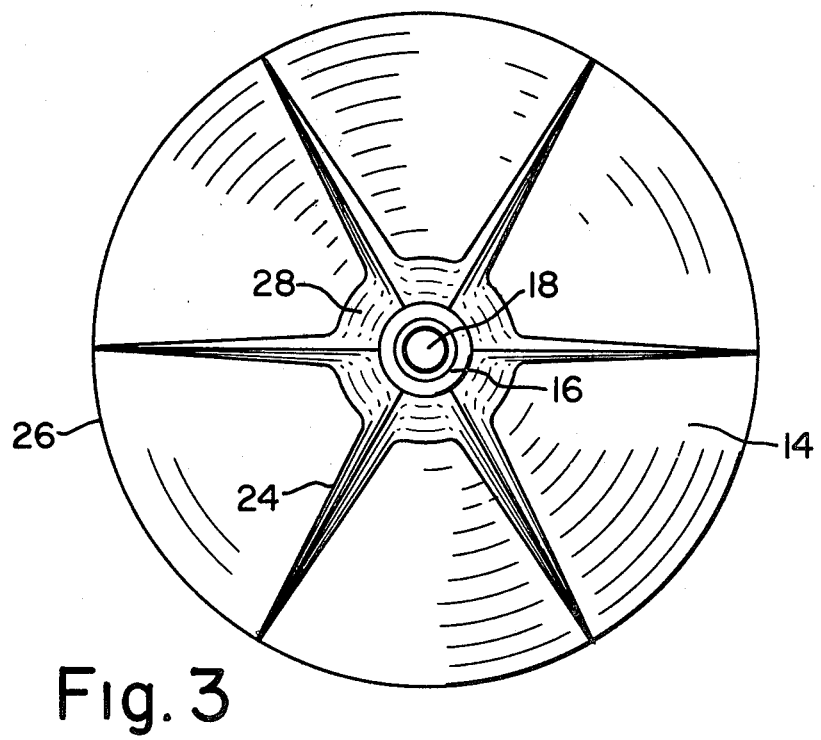
FIG. 3 is a bottom view of the plate shown in FIG. 1.

Referring to FIGS. 1, 2 and 3, a circular plastic plate 10 includes a top surface 12 and a bottom surface 14. It will be recognized that the plate 10 may be other than circular. A tapered hub portion 16 is centrally positioned on and integral with the bottom surface 14. A bore 18 extends through the plate 10 and hub portion 16 and includes a counterbore 20 and a countersink 22 for seating the driving head of a fastener (not shown). The bore 18 preferably has a diameter no larger than the pitch diameter of the fastener adapted to be threaded into it. The hub 16 includes a tapered entry end 17. The axial extent of the hub 16 is such as to provide adequate penetration into the insulation and technically it can extend the entire thickness of the insulation. Anti-rotational means comprising, for example, ribs 24 extend radially outwardly from the hub portion 16 toward the edge 26 of the plate. In a preferred embodiment, there are ribs 24 spaced every 60° about the plate. Each rib includes and extends from a large root portion 28 adjacent the hub portion and tapers into a thin point near the edge 26. Other anti-rotational or rib configurations are also possible.

Figure 7:
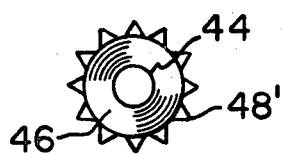
FIG. 7 is a cross-sectional view of the hub taken along lines VII—VII of FIG. 4.
Figure 4:
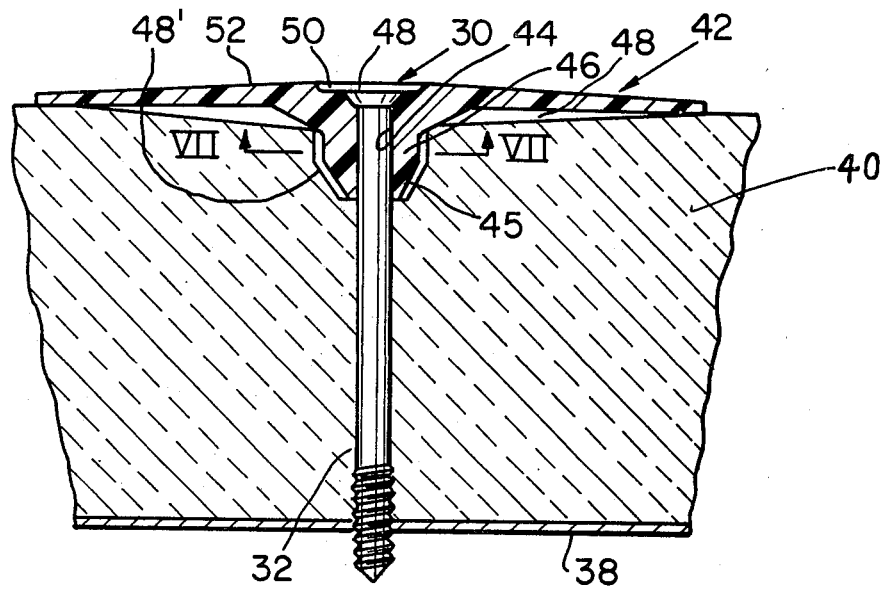
FIG. 4 is a cross-sectional view taken through the central axis of a threaded fastener and plate showing insulation secured to a roof deck.

These other anti-rotational means include noncircular hub configurations (not shown), various other forms of protrusions extending from the plate bottom or hub such as splines 48' in FIGS. 4 and 7.

In another embodiment of the plate (not shown) the bore can be replaced with only a blind pilot hole for starting a self-tapping fastener which is driven through the plastic material in the plate and hub portion. This would be applicable with very rigid insulation which could withstand the additional needed driving force.

Figure 5:
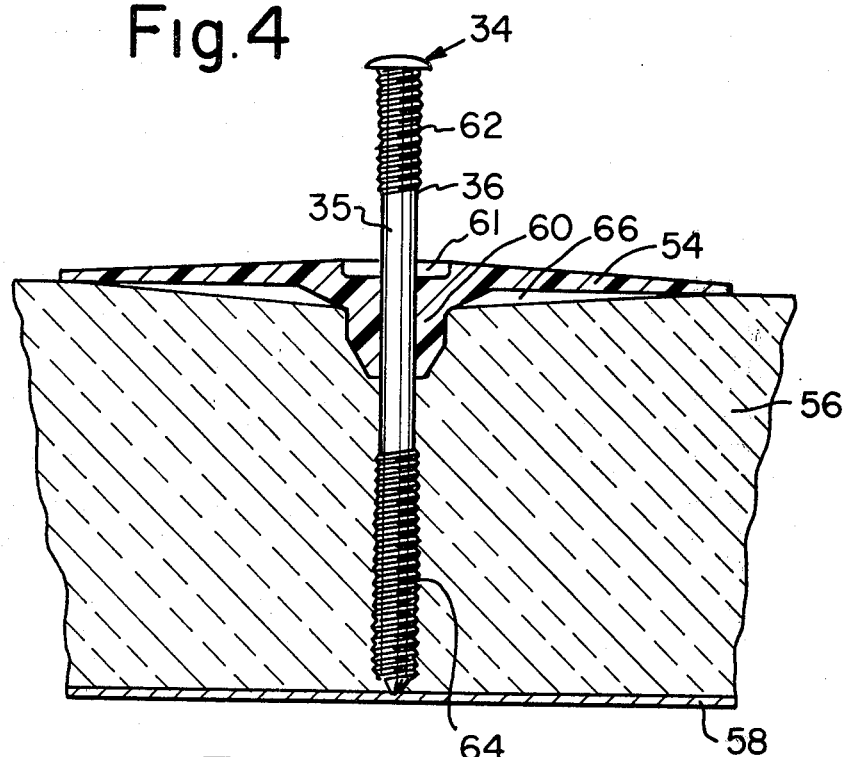
FIG. 5 is a cross-sectional view taken through the central axis of another form of threaded fastener and plate showing the position of the threads of the fastener relative to the plate, insulation and deck at the moment the self-tapping threads of the fastener penetrate the top surface of the roof deck.

FIGS. 4 and 5 illustrate how two forms of threaded fasteners and plates are used to secure insulation to metal roof deck. The fastener 30 shown in FIG. 4 is threaded only at one end of its shank 32. The fastener 34 shown in FIG. 5 includes two sets of threads spaced along its shank 36 with an unthreaded portion 35 therebetween.

Referring first to FIG. 4, a portion of metal roof deck 38 has insulation 40 placed on it. The insulation 40 is secured to the deck 38 by a flat headed fastener 30 and a plate 42 in accordance with the invention. The fastener 30 is driven into bore 44 in the plate 42. The bore has a diameter approximately equal to the pitch diameter of the fastener to hold the fastener in alignment as it is drawn through the insulation 40 which may be six or seven inches thick. The plate 42 may be pre-positioned on the insulation before the fastener 30 is driven or, alternatively, the plate 42 can be attached to the bottom of the driving tool and the fastener driven through it. The entire shank may be threaded.

As soon as the end of the fastener strikes the hub portion 46 of the plate 42, the tapered end 45 of the hub portion 46 begins to penetrate the insulation 40 and the fastener 30 begins to penetrate the hub portion. The driving or setting tool normally has a centering arrangement which directs the point of the fastener so that is penetrates the bore 44 of the plate concentrically.

The fastener 30 self-taps through the plastic plate 42 at which time the anti-rotational means are engaged with the insulation to prevent the plate 42 from turning. The fastener 30 then passes easily through the insulation until the point of the fastener strikes the metal deck 38. The fastener is held in alignment by hub portion 46. The fastener 30 then drills and taps through the metal deck 38 with the anti-rotational ribs 48 of the plate 42 still firmly engaged in the insulation, thus holding the plate securely. Splines 48' may be provided on the hub portion to assist in preventing rotation of the plate. When the proper depth is reached, the top of the driving head 49 of the fastener is seated in the counterbore 50 of the plate below the upper surface 52 of the plate 42. Thereafter, plies of additional roofing material may be placed over the assembly.

Referring to FIG. 5, the fastener 34 which has a standard domed head is installed in substantially the same manner as the fastener 30 in FIG. 4. However, fastener 34 includes two sets of threads which co-act with the other elements to secure plate 54 and thus insulation 56 to roof deck 58. In this embodiment, the fastener 34 is self-tapped through the plate hub portion 60 which maintains the fastener in alignment and then through the insulation 56. Throughout these steps, the ribs 66 prevent rotation of plate 54. The point of fastener 34 engages the deck 58 before the upper set of threads 62 pass into the plate. While the fastener 34 drills and taps into the deck 58, the hub portion 60 is engaging the unthreaded portion 35 of shank 36 without stripping the threads formed in the plate by the lower set of threads 64. Because the diameter of the unthreaded portion 35 is equal to the pitch diameter of the threads 64, the fastener 34 is still held in alignment by the threads previously formed. As the fastener threads 64 further enter into deck 58, the upper set of threads 62 pick up the previously formed thread in the hub portion 60 and the fastener advances until the fastener head seats in the countersink 61.

Because the plate is now secured to the fastener by virtue of its threaded engagement, installers walking on the roof cannot easily push the plate down the shank of the fastener leaving the head of the fastener protruding above the insulation surface to possibly damage the upper ply.

The threaded engagement of threads 62 and hub portion 60 provides high shear resistance against pull out of the plate from the fastener. Again, the ribs 66 on the plate prevent rotation of the plate as the fastener is being driven through the insulation 56 and into deck 58. The ribs may also be on the lower surface of the plate as shown or on the hub portion 60, or both. Normally the ribs extend as shown so that initial penetration into the insulation is adjacent the hub. However, the ribs may also be positioned in a strictly horizontal plane in which case the plate must be seated deeply within the insulation. In this latter condition, a noninterrupted upper surface exists to accommodate special plies.

Figure 6:
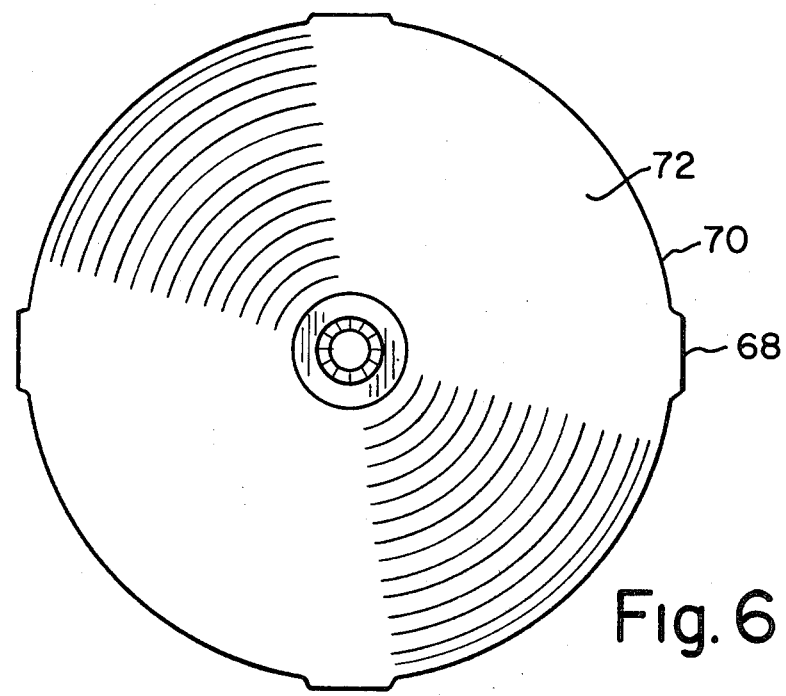
FIG. 6 is a top plan view of a modified form of the plate shown in FIG. 1.

As shown in FIG. 6, tabs or flats 68 may be provided on the edge 70 of a plate 72, preferably at 90° to one another. The flats are engageable with mating recesses in the driving tool and assist the other anti-rotational means in preventing rotation of the plate as it is being driven.

The plastic material is composed of an organic thermoplastic or thermosetting resinous material. It must be somewhat yieldable yet possess sufficient memory to not retain a permanent set under routine loading conditions. It must also have adequate shear strength so the hub is not sheared off by high winds, etc. It has been found that particularly useful materials are polypropylene or high density polyethylene. The particular material may also be dependent on the temperature conditions to which the plastic is exposed.

Plates of the type illustrated have been tested under simulated wind loadings and have been found to be at least equal and generally better than the metal plates currently in use. In fact, plastic plates of the subject invention have withstood simulated wind load testing comparable to metal plates having 20% greater loading area where the load was applied from below the insulation.

Having described presently preferred embodiments of the invention, it is to be understood that it may be otherwise embodied within the scope of the appended claims.

I claim:

1. A plastic plate suitable for use with a fastener to secure insulation to a metal roof deck, said plate comprising:
   A. a substantially planar portion having top and bottom surfaces;
   B. a hub portion for receiving said fastener in force-fit relationship and depending from said bottom surface of said planar portion in a central part thereof and shaped to penetrate into said insulation and permit surface contact with the insulation about said hub and bottom surface;
   C. an opening in at least the upper surface of said planar portion coaxial with the hub portion for aligning said fastener as it is being driven through said hub portion in force-fit relationship; and
   D. anti-rotational means depending from said bottom surface for engagement with said insulation during driving of said fastener.

2. The plate of claim 1, said hub portion having a tapered distal end.

3. A fastener and plate combination suitable for installing insulation on metal roof deck, said combination comprising:
   A. an elongated fastener having a driving head and a a tapered shank, the end of the shank opposite the head including a self-tapping threaded portion;
   B. a plastic plate having a substantially planar portion having top and bottom surfaces, a tapered hub portion depending from the bottom surface of said planar portion in a central part thereof and shaped to penetrate into said insulation and permit surface contact with the insulation about said hub and bottom surface;
   C. an anti-rotational means extending radially outwardly from said hub portion along said bottom surface; and
   D. said fastener being threaded through said plate and said hub portion until said self-tapping threaded portion engages said roof deck and said driving head is seated on the top surface of said plate to secure the insulation to the roof deck.

4. A fastener and plate combination suitable for installing insulation on metal roof deck, said combination comprising:
   A. an elongated fastener having a driving head and a shank, the shank having a self-tapping threaded portion, an adjacent unthreaded portion and a second threaded portion adjacent the driving head;
   B. a plastic plate having a substantially planar portion having top and bottom surfaces, a hub portion depending from the bottom surface of said planar portion in a central part thereof and shaped to penetrate into said insulation and permit surface contact with the insulation about said hub and bottom surface, an opening axially through said plate and hub and having an inside diameter substantially equal to a pitch diameter of said threads and anti-rotational means extending radially outwardly from said hub portion along said bottom surface; and
   C. said fastener dimensioned so that when it is threaded through said hub portion and said insulation and against said roof deck, the unthreaded portion is in said opening and when said fastener is threaded into said metal roof deck and the head is seated on the plate, said second threaded portion is threadably engaged in said hub.

5. The plate as set forth in claim 2, claim 3 or claim 4 including a counterbore extending through said planar portion and said hub portion, the depth of said counterbore being sufficient to receive the head of said fastener such that the top of said head is flush with or below said upper surface.

6. The plate as set forth in claim 2 or 3 wherein said anti-rotational means comprise ribs extending radially outwardly from said hub portion along said bottom surface.

7. The plate as set forth in claim 2 or 3 wherein said anti-rotational means comprise ribs tapering from a relatively large root section adjacent said hub portion to a relatively thin plated section remote from said hub portion.

8. The plate as set forth in claim 2 or 3 wherein said anti-rotational means include ribs which extend along said hub portion.

9. The plate of claim 2, claim 3 or claim 4, said plastic being polypropylene or high density polyethylene.

10. The plate of claim 2 or claim 3 wherein said planar and hub portions include a clear through axial opening to receive said fastener, said opening having a diameter substantially equal to the pitch diameter of the fastener it is to receive.

11. The plate of claim 2 or 3 including spaced apart tabs positioned along the plate periphery to be engaged by a setting tool to assist in preventing rotation of the plate.

12. A fastener and plate combination suitable for installing insulation on metal roof deck, said combination comprising:
   A. an elongated fastener having a driving head and a shank, the shank having a self-tapping threaded portion, an adjacent unthreaded portion and a second threaded portion adjacent the driving head;
   B. a plastic plate having a substantially planar portion having top and bottom surfaces, a hub portion depending from the bottom surface of said planar portion in a central part thereof, an opening axially through said plate and hub and having an inside diameter substantially equal to a pitch diameter of said threads and tapered ribs extending radially outwardly from said hub portion along said bottom surface; and
   C. said fastener dimensioned so that when it is threaded through said hub portion and said insulation and against said roof deck, the unthreaded portion is in said opening and when said fastener is threaded into said metal roof deck and the head is seated on the plate, said second threaded portion is threadably engaged in said hub.

13. A fastener and plate combination suitable for installing insulation on metal roof deck, said combination comprising:
- A. an elongated fastener having a driving head and a shank, the shank having a self-tapping threaded portion, an adjacent unthreaded portion and a second threaded portion adjacent the driving head;
- B. a plastic plate having a substantially planar portion having top and bottom surfaces, a hub portion depending from the bottom surface of said planar portion in a central part thereof, an opening axially through said plate and hub and having an inside diameter substantially equal to a pitch diameter of said threads and ribs extending radially outwardly from said hub porton along said bottom surface, said ribs tapered from a relatively large root section adjacent said hub portion to a relatively thin plated section remote from said hub portion; and
- C. said fastener dimensioned so that when it is threaded through said hub portion and said insulation and against said rood deck, the unthreaded portion is in said opening and when said fastener is threaded into said metal roof deck and the head is seated on the plate, said second threaded portion is threadably engaged in said hub.

14. A fastener and plate combination suitable for installing insulation on metal roof deck, said combination comprising:
- A. an elongated fastener having a driving head and a a shank, the shank having a self-tapping threaded portion, an adjacent unthreaded portion and a second threaded portion adjacent the driving head;
- B. a plastic plate having a substantially planar portion having top and bottom surfaces, a hub portion depending from the bottom surface of said planar portion in a central part thereof, an opening axially through said plate and hub and having an inside diameter substantially equal to a pitch diameter of said threads and anti-rotational means extending radially outwardly from said hub portion along said bottom surface including ribs which extend along said hub portion; and
- C. said fastener dimensioned so that when it is threaded through said hub portion and said insulation and against said roof deck, the unthreaded portion is in said opening and when said fastener is threaded into said metal roof deck and the head is seated on the plate, said second threaded portion is threadably engaged in said hub.

15. A fastener and plate combination suitable for installing insulation on metal roof deck, said combination comprising:
- A. an elongated fastener having a driving head and a shank, the shank having a self-tapping threaded portion, an adjacent unthreaded portion and a second threaded portion adjacent the driving head;
- B. a plastic plate having a substantially planar portion having top and bottom surfaces, a hub portion depending from the bottom surface of said planar portion in a central part thereof, an opening axially through said plate and hub and having an inside diameter substantially equal to a pitch diameter of said threads, anti-rotational means extending radially outwardly from said hub portion along said bottom surface and spaced apart tabs positioned along the plate periphery to be engaged by a setting tool to assist in preventing rotation of the plate; and
- C. said fastener dimensioned so that when it is threaded through said hub portion and said insulation and against said roof deck, the unthreaded portion is in said opening and when said fastener is threaded into said metal roof deck and the head is seated on the plate, said second threaded portion is threadably engaged in said hub.

* * * * *

UNITED STATES PATENT AND TRADEMARK OFFICE
CERTIFICATE OF CORRECTION

PATENT NO. : 4,361,997
DATED : December 7, 1982
INVENTOR(S) : Charles J. DeCaro

It is certified that error appears in the above-identified patent and that said Letters Patent are hereby corrected as shown below:

Column 2, line 19, delete "a", second occurrence

Claim 3, Column 5, line 40, delete "a".

Claim 6, Column 6, line 22, after "comprise" insert —tapered—.

Claim 13, Column 7, line 15, delete "porton" and insert —portion—.

Claim 13, Column 7, line 21 delete "rood" and insert —roof—.

Claim 14, Column 7, line 29, delete "a", second occurrence.

Signed and Sealed this

Nineteenth Day of July 1983

[SEAL]

Attest:

GERALD J. MOSSINGHOFF

Attesting Officer

Commissioner of Patents and Trademarks